United States Patent
Rahamim et al.

(10) Patent No.: US 11,349,643 B2
(45) Date of Patent: May 31, 2022

(54) TECHNIQUES FOR USING LOCAL KEY MANAGEMENT IN A DATA STORAGE SYSTEM

(71) Applicant: INTERNATIONAL BUSINESS MACHINES CORPORATION, Armonk, NY (US)

(72) Inventors: Eyal Rahamim, Tel Aviv (IL); Alexander Snast, Rishon LeZion (IL)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 16/185,964

(22) Filed: Nov. 9, 2018

(65) Prior Publication Data

US 2020/0213102 A1 Jul. 2, 2020

(51) Int. Cl.
G06F 21/60 (2013.01)
H04L 9/08 (2006.01)
G06F 13/16 (2006.01)
G06F 13/42 (2006.01)
(Continued)

(52) U.S. Cl.
CPC ............. *H04L 9/0822* (2013.01); *G06F 3/00* (2013.01); *G06F 3/0623* (2013.01);
(Continued)

(58) Field of Classification Search
CPC ....... H04L 9/08; H04L 9/0822; H04L 9/0866; H04L 9/0869; H04L 9/0894; H04L 9/0897; H04L 9/30; H04L 9/3033; H04L 9/32; H04L 63/04; H04L 63/0478; H04L 63/0428; G06F 21/602; G06F 21/64; G06F 21/78; G06F 21/60; G06F 21/71
See application file for complete search history.

(56) References Cited

U.S. PATENT DOCUMENTS 7,373,515 B2   5/2008 Owen et al.
8,751,827 B1*  6/2014 Duane ................. G06F 21/32
                                              713/193
(Continued)

OTHER PUBLICATIONS

Crossman et al.. "Two-factor authentication through near field communication." Technologies for Homeland Security (HST), 2016 IEEE Symposium on. IEEE, 2016.
(Continued)

*Primary Examiner* — Shaqueal D Wade-Wright
(74) *Attorney, Agent, or Firm* — Brian F. Russell; Tithon Poltavets

(57) ABSTRACT

A data security technique for a data storage system includes in response to connection of an external storage device to a port of the data storage system, retrieving an authentication key encryption key (AKEK) for the data storage system from the external storage device to the data storage system. A random wrapper key (RWK) is generated based on the AKEK and an encrypted random wrapper key (ERWK) for the data storage system (retrieved from a first key repository of the data storage system). The ERWK is retrieved from a first key repository of the data storage system. A master key (retrieved from a second key repository of the data storage system) is decrypted for the data storage system using the RWK. A device access key (DAK) is derived based on the master key. The DAK is used to encrypt/decrypt data for a drive associated with the DAK.

20 Claims, 7 Drawing Sheets

(51) Int. Cl.
    G06F 3/06     (2006.01)
    H04L 9/32     (2006.01)
    G06F 3/00     (2006.01)
    G06F 13/00    (2006.01)
(52) U.S. Cl.
    CPC .......... *G06F 3/0659* (2013.01); *G06F 3/0674* (2013.01); *G06F 3/0679* (2013.01); *G06F 13/00* (2013.01); *G06F 13/1668* (2013.01); *G06F 13/4282* (2013.01); *G06F 21/602* (2013.01); *H04L 9/0869* (2013.01); *H04L 9/3242* (2013.01); *G06F 2213/0042* (2013.01)

(56) References Cited

U.S. PATENT DOCUMENTS

| | | |
|---|---|---|
| 2002/0053022 A1 | 5/2002 | Groves et al. |
| 2006/0107068 A1 | 5/2006 | Fiske |
| 2007/0169182 A1 | 7/2007 | Wolfond et al. |
| 2011/0302398 A1* | 12/2011 | Ureche ................ H04L 9/0894 713/2 |
| 2015/0355979 A1* | 12/2015 | Volvovski ........... G06F 21/6218 707/675 |
| 2017/0093563 A1* | 3/2017 | Gazit .................... H04L 9/0643 |
| 2017/0372085 A1* | 12/2017 | Howe ................... H04L 9/0861 |
| 2019/0238323 A1* | 8/2019 | Bunch .................. H04L 9/0877 |

OTHER PUBLICATIONS

Yizheng et al., "Design and Implementation of USB Key-Based JavaEE Dual-Factor Authentication System." Information Management, Innovation Management and Industrial Engineering, 2009 International Conference on. vol. 4. IEEE, 2009.

Jurczyk. Towards scalable and privacy-preserving integration of distributed heterogeneous data. Diss. Emory University, 2010.

* cited by examiner

TECHNIQUES FOR USING LOCAL KEY MANAGEMENT IN A DATA STORAGE SYSTEM

BACKGROUND OF THE INVENTION

This disclosure relates to data storage systems and, more specifically, to techniques for using local key management in a data storage system.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

In cryptography, a key is a piece of information that determines a functional output of a cryptographic algorithm. For encryption algorithms a key specifies the transformation of plaintext into ciphertext and for decryption algorithms the key specifies the transformation of ciphertext into plaintext. Keys also specify transformations in other cryptographic algorithms, such as Message Authentication Codes (MACs) and digital signature schemes. A Hash-based Message Authentication Code (HMAC) is a specific type of MAC that employs a cryptographic hash function and a secret key.

An HMAC may be used to simultaneously verify both data integrity and authentication of a message. Virtually any cryptographic hash function may be used in the calculation of an HMAC. The cryptographic strength of an HMAC depends upon the cryptographic strength of the underlying hash function, the size of a hash output of the HMAC, and the size and quality of the secret key. An HMAC uses two passes of hash computation. A secret key is first used to derive two keys, i.e., an inner key and an outer key. The first pass of the algorithm produces an internal hash derived from the message and the inner key. The second pass produces a final HMAC derived from the internal hash and the outer key.

As is known, digital certificates are used to bind information with an identity such that a receiver can trust a sender. Digital certificates are signed by a Certificate Authority (CA). If a user trusts the CA and can verify a signature of the CA the user can verify that certain information belongs to a person or an entity that is identified in the certificate. For example, a digital certificate may include: a name of an issuer; a subject distinguished name (DN); a public key that belongs to an owner of the digital certificate; a validity date for the public key; a serial number of the digital certificate; and a digital signature of the issuer.

BRIEF SUMMARY

A technique for providing data security for a data storage system using local key management includes in response to connecting an external storage device to a port of the data storage system, retrieving an Authentication Key Encryption Key (AKEK) for the data storage system from the external storage device to the data storage system. A Random Wrapper Key (RWK) is generated based on the AKEK and an Encrypted Random Wrapper Key (ERWK) for the data storage system. The ERWK is retrieved from a first key repository of the data storage system. A master key is decrypted for the data storage system using the RWK. The master key is retrieved from a second key repository of the data processing system. A device access key (DAK) is derived based on the master key. The DAK is used to encrypt/decrypt data for a drive associated with the DAK.

The disclosed techniques may be implemented as a method, a data storage system, and/or a program product (including program code stored in a storage device).

DETAILED DESCRIPTION

Figure 1A:
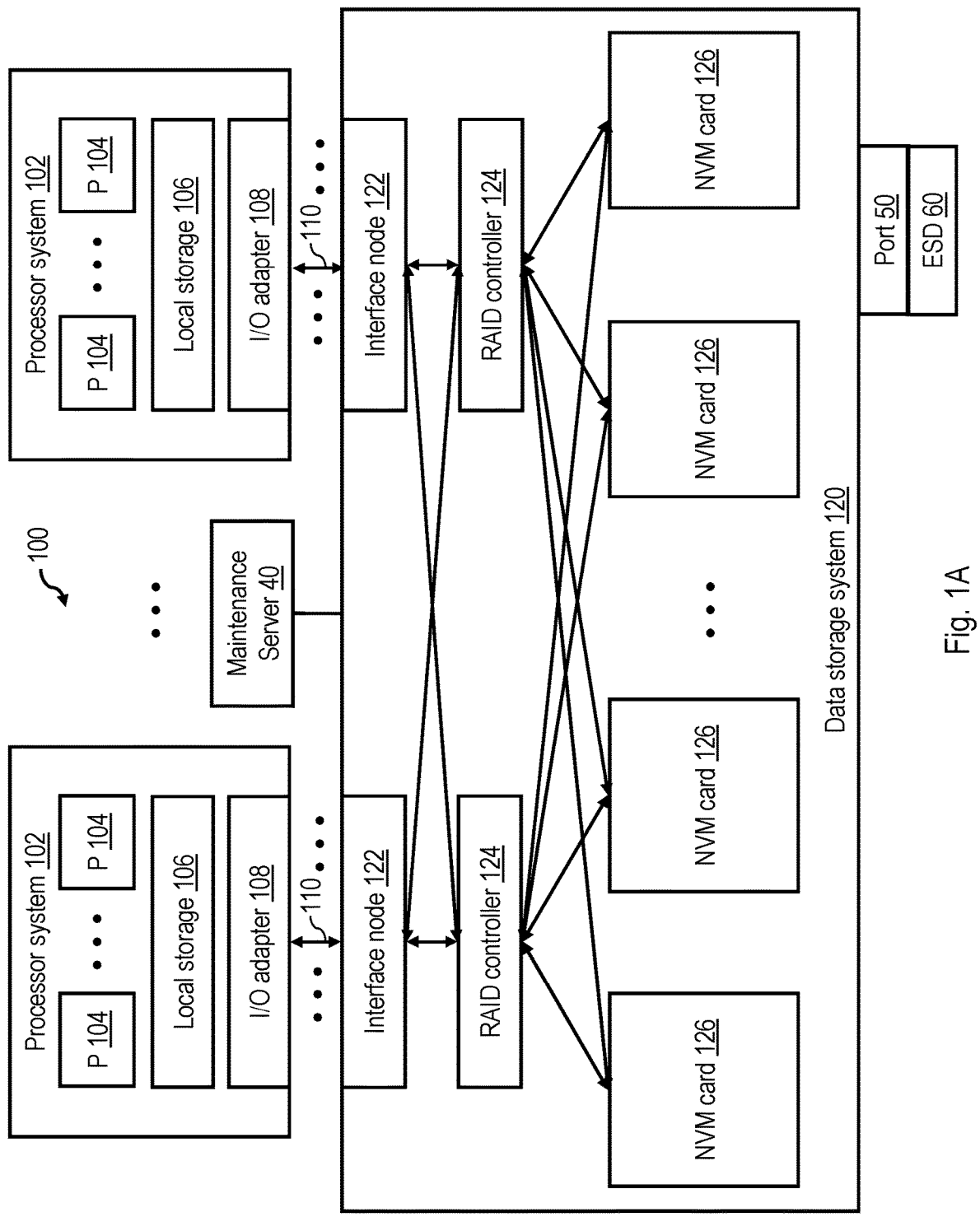
FIG. 1A is a high level block diagram of a data processing environment in accordance with one embodiment.

In a storage system that implements Self Encrypting Devices (SEDs), Device Access Keys (DAKs) have been generated based on a master key (e.g., an XIV Master Key (XMK) in an XIV storage system) using a Hash-based Message Authentication Code (HMAC) function. In general, a single master key has been used to generate all DAKs in the storage system. Typically, the single master key has been encrypted by a Random Wrapper Key (RWK) and the encrypted master key has been stored in a key repository of the storage system.

For example, an RWK may take the form of an External Session Key (ESK) that is supplied by an external key server. Encrypting/decrypting the master key with an ESK provides additional security due to requiring external authentication to a secured authority before allowing access to data on a storage system. In this case, the external key server provides physical separation between data in the data storage system and an RWK allocation and retrieval mechanism. The physical separation between data and the RWK ensures that the RWK is secure even if the storage system is compromised. However, employing an external key server increases complexity and cost of a storage system architecture and requires a reliable communication channel be provided between a storage system and the external key server.

As another example, an RWK may be stored internally on a storage system that employs local key management. Employing local key management typically reduces complexity and cost of a storage system architecture, as compared to a storage system architecture that implements an external key server, albeit at reduced security. In local key management, an RWK has conventionally been stored internally on a storage system or on an external device. Storing an RWK on an external device may result in exposure or loss of the RWK, exposes the RWK to human foibles, and weakens a security and survivability model. As one example, implementing an internal RWK allocation and local retrieve mechanism has required redundancy in order to avoid RWK loss and associated data inaccessibility. In general, storing an RWK internally on a storage system has conventionally required that the RWK be duplicated to avoid data loss, as the RWK is used to unwrap the master key and enable data encryption/decryption.

A use case to consider when planning for data security of a storage system is transportation of the storage system when it includes protected user data. Typically, transporting a storage system has required a technician to disassemble the storage system into components at an origin and reassemble the storage system when the components have arrived at a destination. Using external key management facilitates employing external authentication prior to allowing a storage system to retrieve an RWK (to retrieve a master key, which is used to derive DAKs). However, as previously mentioned, external key management is dependent on reliable connectivity to an external key server or availability of a recovery key in order to retrieve an RWK.

Using local key management where the RWK is stored on an external device can lead to inaccessible data in the event the external device is lost. Additionally, storing an RWK inside a transported storage system creates security vulnerabilities as an RWK stored on an unencrypted system device may be accessed by an unauthorized person. Moreover, when assembled and powered up a storage system may decrypt user data without requiring input from an authorized person (e.g., a security administrator) when an RWK is stored on an unencrypted system device. In general, known local key management approaches allow access to an RWK (and hence stored data) without requiring external physical authentication. Known local key management systems generally protect against unauthorized access to physical storage devices, but do not protect against unauthorized access to an entire storage system. With conventional local key management systems, keys are stored within a storage system and, as such, the keys (and therefore data) may be accessed if the entire storage system is stolen.

According to various embodiments of the present disclosure, techniques are disclosed that store an RWK such that security of transporting a storage system protected using local key management is improved. According to embodiments of the present disclosure, an RWK is divided into two parts. A first part of the RWK (i.e., an Encrypted RWK (ERWK)) is stored on a storage system and a second part of the RWK (i.e., an Authentication Key Encryption Key (AKEK)) is stored on an external storage device (e.g., a Universal Serial Bus (USB) device) that is connected to the storage system via a port that corresponds to a known mount device. In one or more embodiments, the AKEK has strong dependency to the ERWK. In general, requiring the presence of an external storage device in order to access the ERWK provides stronger protection, as compared with other approaches.

Splitting the RWK into an ERWK and an AKEK (with strong dependency between the ERWK and the AKEK) provides a security administrator with the ability to control the retrieval of an RWK. In one or more embodiments, an AKEK is stored on an external storage device that is separate from encrypted 'data' and an associated ERWK. In general, a storage system that employs an external storage device that includes an AKEK signed using a digital certificate for authentication is able to: block automatic decryption of 'data' by unauthorized personnel that have all storage system components and know how to assemble the components; provide strong authentication to retrieve the ERWK on operations that include a first encrypt enable, booting an encrypted storage system, or rekeying (e.g., allocating a new RWK); provide separate authorities as only a security administrator has the privilege to access the ERWK using the external storage device and in this way the security administrator can increase supervision of unauthorized personnel; and allow for easy reconstruction of an external storage device in the event the external storage device is missing. The disclosed techniques may, for example, be implemented using local key management and an external Rivest-Shamir-Adleman (RSA) authentication key.

According to one or more embodiments of the present disclosure, access to an RWK for a storage system requires the retrieval of a signed AKEK file from an external storage device that electrically connects to a port of the storage system. A digital certificate for the storage system is allocated (e.g., by a security administrator) when an RWK is generated (e.g., during encrypt enable and rekey operations) for the storage system. In various embodiments, the AKEK is signed with the digital certificate and stored on an external storage device. Each access to a local key repository to retrieve an ERWK (to generate an RWK) requires the presence of the external storage device as an authenticated permission for a relevant operation. As examples, relevant operations include: allocation of a new RWK; replacement of an old RWK; and decryption of an RWK during system reboot.

As one example, a software implementation may construct an RWK using a HMAC function of AKEK and ERWK (e.g., $f_{HMAC}$(AKEK, ERWK)). In one or more embodiments, the ERWK is stored in a local key repository of a storage system with redundancy on all modules. Each storage system has a link to a 'known mount volume' that corresponds to an associated port for the external storage device. Inserting an external storage device into the associated port of the storage system triggers a secure mount to the external storage device, verification that an appropriately signed AKEK file is stored on the external storage device, and retrieval of the AKEK to the storage system when the AKEK file is appropriately signed. Upon receiving a verified AKEK file and retrieving an ERWK the storage system can retrieve the RWK (using $f_{HMAC}$(AKEK, ERWK)) and use the RWK to decrypt the master key, which can then be used to derive one or more DAKs.

According to one or more embodiments of the present disclosure, an encryption enable operation for a storage system initiates the creation of an AKEK that is signed with a digital certificate. Signing the AKEK blocks unauthorized encrypt/decrypt operations. The AKEK authentication is stored on an external storage device, which is created in response to an associated operation. For example, an enable encryption operation may create two private two RSA keys (i.e., an AKEK and the ERWK), sign the AKEK, and store the ERWK in a key repository on the storage system. To avoid malicious use of the external storage device, the external storage device may be packed as an encrypted device that can only be unpacked by a storage system to prevent an unauthorized external storage device from being mounted into the storage system. Subsequent creation of an RWK requires authentication of an external storage device that includes the AKEK, retrieval of the ERWK, and performing an HMAC on the AKEK and the ERWK (i.e., RWK=$f_{HMAC}$(AKEK, ERWK). The creation of a new AKEK and ERWK may also be generated using the above process.

A process to retrieve an RWK may depend on a state of a storage system. On a first allocation of the RWK with a storage system in an 'on' state and encryption in a 'supported' state connecting an external storage device to a port of the storage system may cause a master key, an AKEK, and an ERWK to be generated. The ERWK and an encrypted master key are then stored in a key repository of the storage system and the AKEK is signed and stored on the external storage device. On a reallocation of an RWK with a storage system in an 'on' state and encryption in an 'enabled' state connecting the external storage device to the port causes a current RWK to be retrieved and an allocation of new RWK which causes a new ERWK to be generated and stored in the key repository. When decrypting data the storage system is in a 'booting' state and an encryption 'supported' state and connecting the external storage device to the port allows a current RWK to be retrieved and passed to relevant components in order to decrypt data.

Advantageously, the described techniques make an attack on encrypted data more difficult and improve operation of a storage system by increasing data security. In general, a successful attack on a storage system that implements the disclosed techniques requires more knowledge on the part of an attacker. For a successful attack, an attacker must obtain the AKEK which is stored on a unique external storage device that is separate from a storage system and circumvent the additional security measures outlined above.

With reference to the figures and with particular reference to FIG. 1A, there is illustrated a high level block diagram of an exemplary data processing environment 100 including a data storage system 120 that is configured to implement local key management according to the present disclosure. As shown, data processing environment 100 includes one or more hosts, such as a processor system 102 having one or more processors 104 that process instructions and data. Processor system 102 may additionally include local storage 106 (e.g., Dynamic Random Access Memory (DRAM) or disks) that may store program code, operands and/or execution results of the processing performed by processor(s) 104. In various embodiments processor system 102 can be, for example, a mobile calculating device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, Input/Output (I/O) bus hubs, etc.

Each processor system 102 further includes an I/O adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), Non-volatile Memory Express (NVMe), NVMe over Fabrics, etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface nodes 122 through which data storage system 120 receives and responds to IOPs via I/O channels 110. Each interface node 122 is coupled to each of multiple outer Redundant Array of Independent Disks (RAID) controllers 124 in order to facilitate fault tolerance and load balancing. Each of outer RAID controllers 124 is in turn coupled (e.g., by a PCIe bus) to each of multiple NVM cards 126 including, in this example, NVM storage media. In other embodiments, other lossy storage media can be employed.

Data processing environment 100 also includes a maintenance server 40 that is used by a system administrator to maintain data storage systems 120. More specifically, as is discussed further in conjunction with FIG. 4, at the direction of a system administrator maintenance server 40 is configured to generate an AKEK, an ERWK, and an encrypted master key for each data storage system 120, store the AKEK in an external storage device (ESD) 60 that is configured to be electrically connected to a port 50 of data storage system 120, and store the ERWK and the encrypted master key in one or more key repositories in data storage system 120.

Figure 1B:
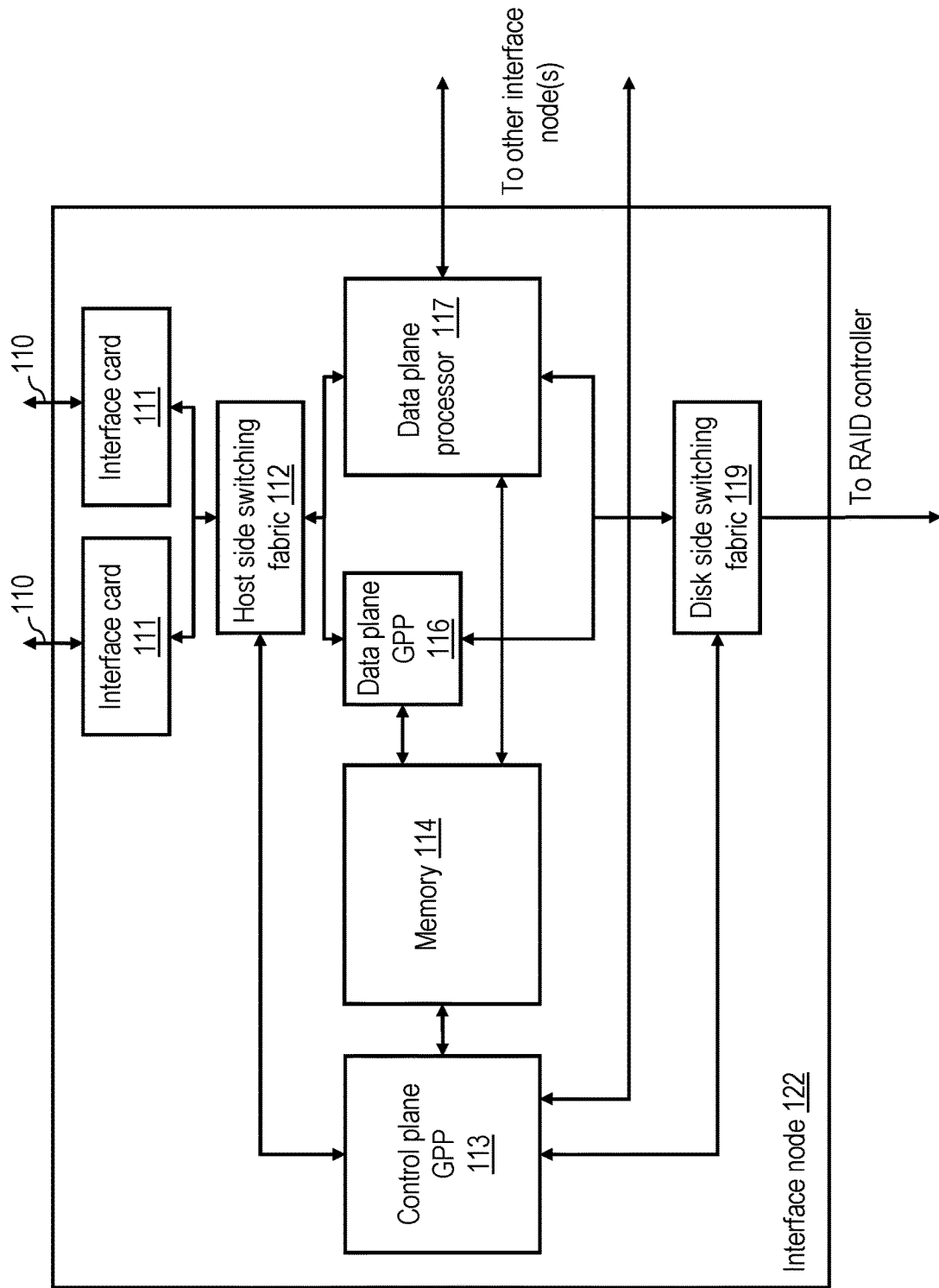
FIG. 1B is a more detailed block diagram of an exemplary interface node of a data storage system of FIG. 1A.

FIG. 1B depicts a more detailed block diagram of an interface node 122 of data storage system 120 of FIG. 1A.

Interface node 122 includes one or more interface cards 111 that serve as an interface to processor systems 102 through I/O channels 110 and connect to host side switching fabric 112. The host side switching fabric 112 acts as a switch and handles all data transfers between interface cards 111 and processing units in interface node 122, namely control plane general purpose processor (GPP) 113, data plane GPP 116, and data plane processor 117. Typically, host side switching fabric 112 consist of a PCIe switch, but other switch technologies may be used as well. In one or more embodiments, data plane processor 117 is a special purpose processor that can be implemented, for example, by an Application Specific Integrated Circuit (ASIC) or a Field Programmable Gate Array (FPGA). Control plane GPP 113, data plane GPP 116, and data plane processor 117 are all connected to memory 114 which may be implemented as a shared memory between these components, separate memories, or a combination thereof.

In embodiments in which data plane processor 117 is implemented with an FPGA, control plane GPP 113 may program and configure data plane processor 117 during start-up of data storage system 120. Data plane GPP 116 and control plane GPP 113 control data plane processor 117 as well as access to NVM cards 126 either indirectly through the control of data plane processor 117 or directly through disk side switching fabric 119. Control plane GPP 113 executes system management functions as well as higher level services such as snapshots, thin provisioning, and deduplication. Data plane GPP 116 executes protocol specific functions. Control plane GPP 113, data plane GPP 116, and data plane processor 117 are connected to outer RAID controller 124 through disk side switching fabric 119 which typically consist of a PCIe switch, but other switch technologies may be used as well. FIG. 1B further illustrates control plane GPP 113 and data plane processor 117 being connected to other interface nodes 122 in data storage system 120 to handle fail-over scenarios or for performing other data synchronization functions.

Figure 1C:
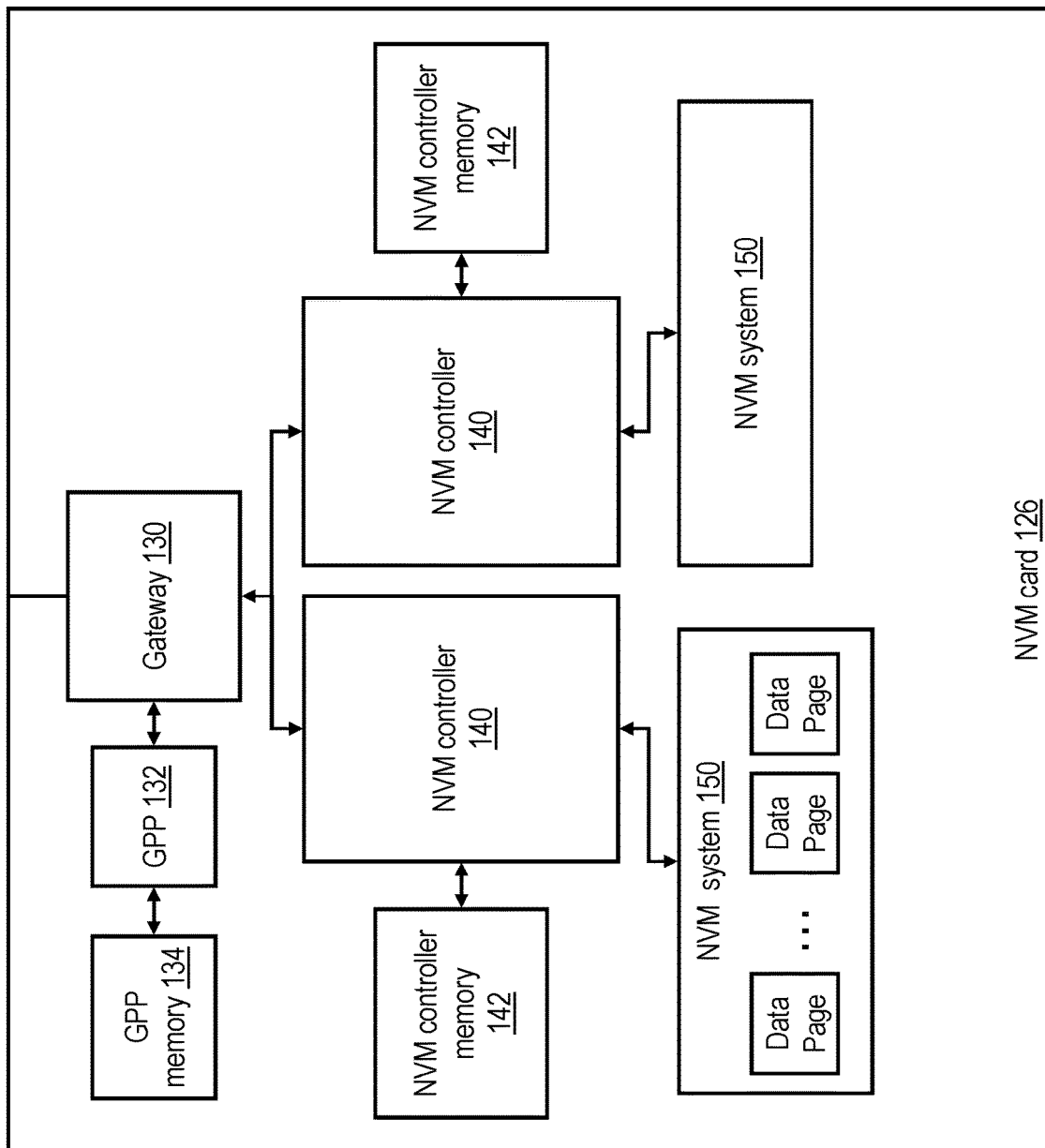
FIG. 1C is a more detailed block diagram of an exemplary non-volatile memory (NVM) card of the data storage system of FIG. 1A.

FIG. 1C depicts a more detailed block diagram of an NVM card 126 of data storage system 120 of FIG. 1A. NVM card 126 includes a gateway 130 that serves as an interface between NVM card 126 and outer RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by NVM card 126. GPP 132 is coupled to a GPP memory 134 (e.g., Dynamic Random Access Memory (DRAM) or Magneto-resistive Random Access Memory (MRAM)) that can conveniently buffer data created, referenced, and/or modified by GPP 132 in the course of its processing.

Gateway 130 is further coupled to multiple NVM controllers 140, each of which controls a respective NVM system 150. The NVM controllers 140 may implement combined ECC/RAID data protection techniques for a NVM array. NVM controllers 140 can be implemented, for example, by an Application Specific Integrated Circuit (ASIC) or a Field Programmable Gate Array (FPGA) having an associated NVM controller memory 142 (e.g., DRAM). In embodiments in which NVM controllers 140 are implemented with an FPGA, GPP 132 may program and configure NVM controllers 140 during start-up of data storage system 120. After startup, in general operation NVM controllers 140 receive read and write IOPs from gateway 130 that request to read data stored in NVM system 150 and/or to store data in NVM system 150. NVM controllers 140 service these IOPs, for example, by accessing NVM systems 150 to read or write the requested data from or into NVM systems 150 or by accessing one or more read and/or write caches (not illustrated in FIG. 1C) associated with NVM systems 150.

NVM controllers 140 implement a translation layer that provides logical-to-physical address translation to enable access to specific memory locations within NVM systems 150. In general, an IOP received by NVM controller 140 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. The LBA provided by the host device corresponds to a logical page within a logical address space, the logical page typically having a size in the range between 512 bytes to four (4) kilobytes or more. The translation layer translates this LBA into a physical address assigned to a corresponding physical location in a NVM system 150.

NVM controllers 140 may perform address translation and/or store mappings between logical and physical addresses in a logical-to-physical translation data structure, such as a logical-to-physical translation (LPT) table, which may conveniently be stored in NVM controller memory 142. An LPT table may also be configured to store compressed page sizes of data pages stored in NVM system 150 and even further their CRC values.

Having described the general physical structure and operation of one exemplary embodiment of a data storage system 120, certain operational aspects of data storage system 120 are now described with reference to FIG. 2, which is a high level flow diagram of the flash management functions and data structures employed by GPP 132 and/or NVM controllers 140 in accordance with one embodiment.

As noted above, data storage system 120 does not generally allow external devices to directly address and/or access the physical memory locations within NVM systems 150. Instead, data storage system 120 is generally configured to present a single contiguous logical address space to the external devices, thus allowing host devices to read and write data to and from LBAs within the logical address space while permitting NVM controllers 140 and GPP 132 to control where the data that is associated with the various LBAs actually resides in the physical memory locations comprising NVM systems 150. In this manner, performance and longevity of NVM systems 150 can be intelligently managed and optimized. In the illustrated embodiment, each NVM controller 140 manages the logical-to-physical translation using a logical-to-physical translation data structure, such as logical-to-physical translation (LPT) table 200, which can be stored in the associated flash controller memory 142. An LPT table, such as LPT table 200, can also be configured to store compressed page sizes of data pages stored in NVM systems 150 and/or other metadata to aid in data deduplication.

Flash management code running on the GPP 132 tracks erased blocks of NVM system 150 that are ready to be used in ready-to-use (RTU) queues 206, which may be stored, for example, in GPP memory 134. In the depicted embodiment, management code running on the GPP 132 preferably maintains one or more RTU queues 206 per channel, and an identifier of each erased block that is to be reused is enqueued in one of RTU queues 206 corresponding to its channel. For example, in one embodiment, RTU queues 206 include, for each channel, a respective RTU queue 206 for each of a plurality of block health grades. In various implementations, between 2 and 8 RTU queues 206 per lane (and a corresponding number of block health grades) have been found to be sufficient.

A build block stripes function 220 performed by flash management code running on GPP 132 may be implemented to construct new block stripes for storing data and associated parity information from the erased blocks enqueued in RTU queues 206. Block stripes are preferably formed of blocks of the same or similar health (i.e., expected remaining useful life) residing in different channels, meaning that build block stripes function 220 can conveniently construct a block stripe by drawing each block of the new block stripe from corresponding RTU queues 206 of different channels. The new block stripe is then queued to NVM controller 140 for data placement.

In response to a write IOP received from a host, such as a processor system 102, a data placement function 210 of NVM controller 140 determines by reference to LPT table 200 whether the target LBA(s) indicated in the write request is/are currently mapped to physical memory page(s) in NVM system 150 and, if so, changes the status of each data page currently associated with a target LBA to indicate that it is no longer valid. In addition, data placement function 210 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 220. In one embodiment, the page stripe allocation can be based on the health of the blocks available for allocation and the "heat" (i.e., estimated or measured write access frequency) of the LBA of the write data. Data placement function 210 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. NVM controller 140 also updates LPT table 200 to associate the physical page(s) utilized to store the write data with the LBA(s) indicated by the host device. Thereafter, NVM controller 140 can access the data to service host read IOPs by reference to LPT table 200 as further illustrated in FIG. 2.

Once all pages in a block stripe have been written, NVM controller 140 places the block stripe into one of occupied block queues 202, which flash management code running on GPP 132 utilizes to facilitate garbage collection. As noted above, through the write process, pages are invalidated, and therefore portions of NVM 150 become unused. An associated NVM controller 140 (and/or GPP 132) eventually needs to reclaim this space through garbage collection performed by a garbage collector 212. Garbage collector 212 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 204, which can conveniently be implemented in the associated flash controller memory 142 or GPP memory 134.

The NVM management functions performed by GPP 132 or NVM controller 140 additionally include a relocation function 214 that relocates the still valid data held in block stripes enqueued in relocation queue 204. To relocate such data, relocation function 214 issues relocation write requests to data placement function 210 to request that the data of the old block stripe be written to a new block stripe in NVM system 150. In addition, relocation function 214 updates LPT table 200 to remove the current association between the logical and physical addresses of the data and to replace it with the new association. Once all still valid data has been moved from the old block stripe, the old block stripe is passed to dissolve block stripes function 216, which decomposes the old block stripe into its constituent blocks, thus disassociating the blocks. NVM controller 140 then erases each of the blocks formerly forming the dissolved block stripe and increments an associated program/erase (PE) cycle count for the block in PE cycle counts 244. Based on the health metrics of each erased block, each erased block is either retired (i.e., no longer used to store user data) by a block retirement function 218 among the flash management functions executed on GPP 132, or alternatively, prepared for reuse by placing the block's identifier on an appropriate ready-to-use (RTU) queue 206 in associated GPP memory 134.

Figure 2:
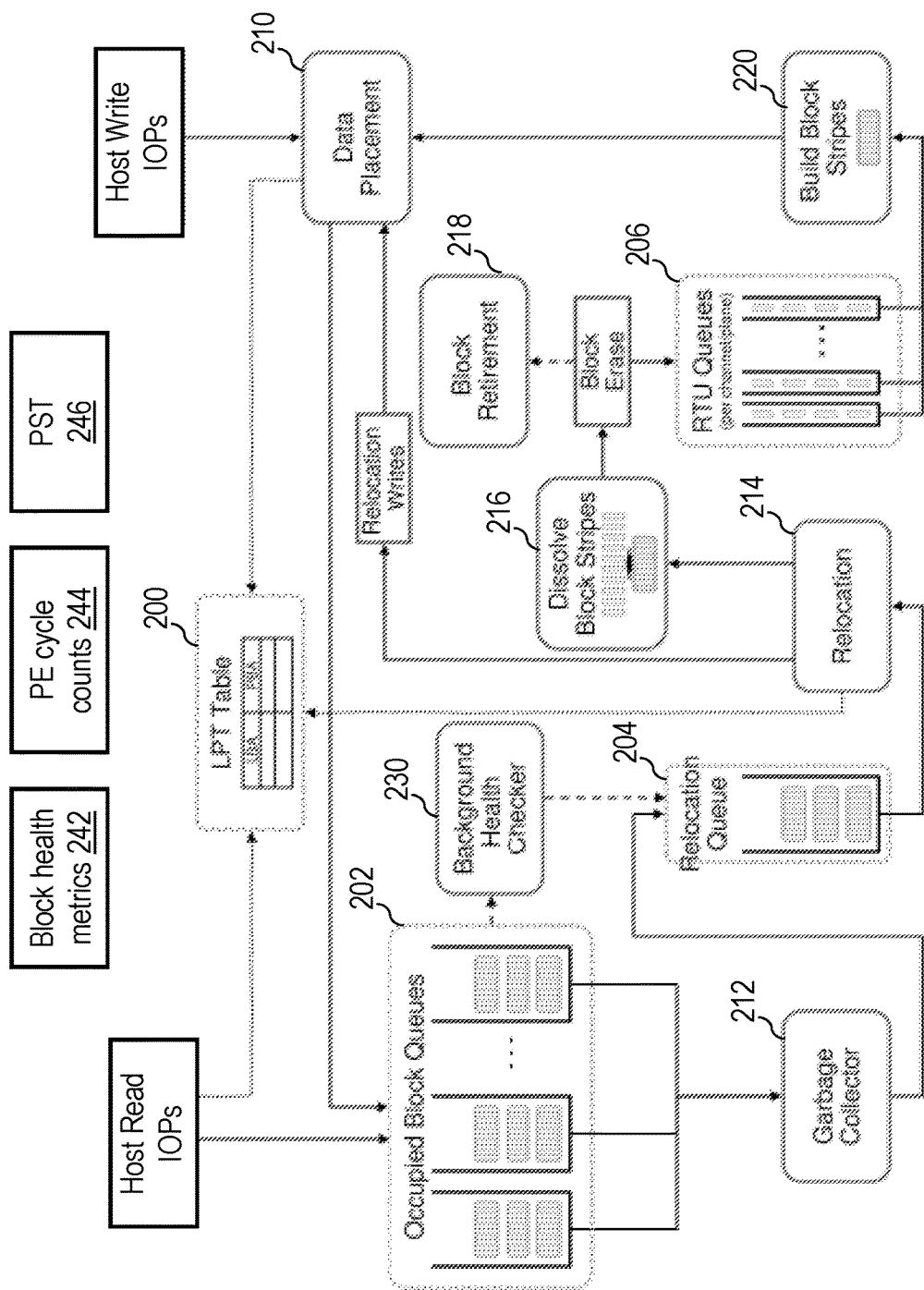
FIG. 2 is a high level flow diagram of the Flash management functions and data structures employed by an NVM controller in accordance with one embodiment.

As further shown in FIG. 2, NVM management functions executed on GPP 132 include a Background Health Checker (BGHC) 230. BGHC 230, which operates independently of the demand read and write IOPs of hosts such as processor systems 102, continuously determines one or more block health metrics 242 for blocks belonging to block stripes recorded in occupied block queues 202. Based on the one or more of block health metrics 242, BGHC 230 may place block stripes on relocation queue 204 for handling by relocation function 214.

Figure 3:
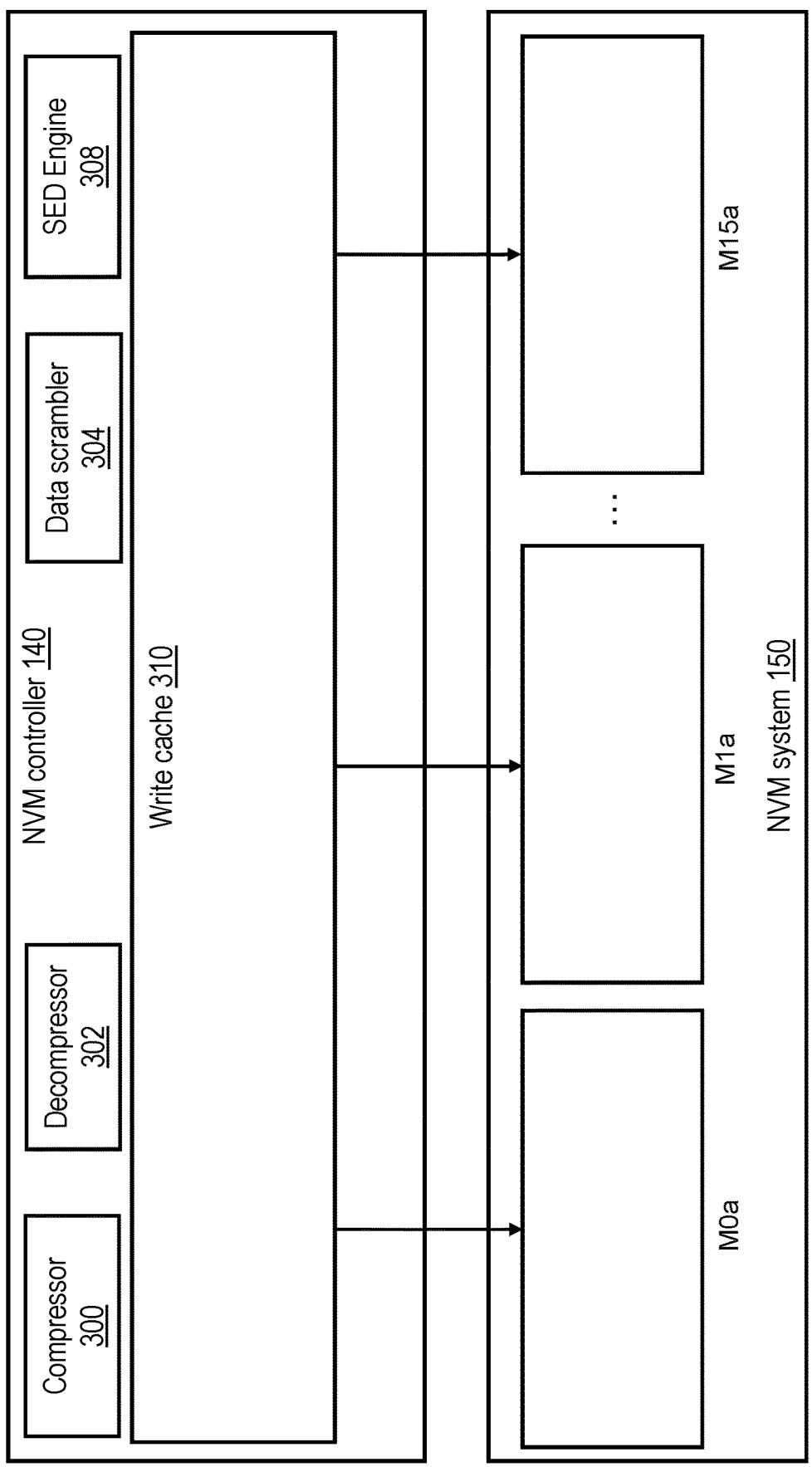
FIG. 3 depicts a view of an exemplary NVM controller and an exemplary NVM system of FIG. 1C.

NVM systems 150 may take many forms in various embodiments. Referring now to FIG. 3, there is depicted one exemplary arrangement of physical memory within a NVM system 150 in accordance with one exemplary embodiment.

NVM system 150 may be formed from thirty-two (32) individually addressable NVM storage devices, which will be referred to as packages. In the illustrated example, each of the NVM storage devices M0a-M15b takes the form of a board-mounted NVM module capable of storing one, two or more bits per cell. Thus, NVM modules may be implemented with Single Level Cell (SLC), Multi-Level Cell (MLC), Three Level Cell (TLC), Quad Level Cell (QLC) memory, or another type of NVM. The thirty-two NVM modules are arranged in sixteen groups of two, (M0a, M0b) through (M15a, M15b). For purposes of the physical addressing scheme, each group of two modules forms a "lane," also sometimes referred to as a "channel," such that NVM system 150 includes sixteen channels or lanes (Lane0-Lane15).

In one embodiment, each of the individual lanes has a respective associated bus coupling it to the associated NVM controller 140. Thus, by directing its communications to one of the specific communication buses, NVM controller 140 can direct its communications to one of the lanes of memory modules. Because each communication bus for a given lane is independent of the communication buses for the other lanes, a NVM controller 140 can issue commands and send or receive data across the various communication buses at the same time, enabling the NVM controller 140 to access the NVM modules corresponding to the individual lanes at, or very nearly at, the same time.

In the illustrated embodiment, NVM controller 140 includes a compressor 300 that selectively applies one or more data compression algorithms to data written to the associated NVM system 150, a decompressor 302 that decompresses compressed data read from NVM system 150, a self encrypting device (SED) engine 308 that encrypts/decrypts data for a drive (e.g., a hard disk drive (HDD), a flash memory drive, a non-volatile memory drive), and a data scrambler 304. NVM controller 140 utilizes data scrambler 304 to apply a predetermined data scrambling (i.e., randomization) pattern to data written to NVM system 150 in order to improve endurance. As further illustrated in FIG. 3, NVM controller 140 includes a write cache 310. Write cache 310 includes storage for one or more cache lines for buffering write data in anticipation of writing the data to NVM system 150.

Conventional data storage system architectures (including Storage Area Network (SAN) and Network Attached Storage (NAS) solutions) have typically relied on a centralized storage controller that receives and distributes Input/Output (I/O) requests across an array of storage devices (e.g., Hard Disk Drives (HDDs), SSDs, Flash Card Modules (FCMs)). In a conventional data storage system, a storage controller has been configured to distribute data across an array of storage devices utilizing a data protection technology (e.g., a Redundant Array of Independent Disks (RAID) technology) so that the storage system can withstand the failure of at least one of the storage devices. In a conventional storage system, a storage controller has also been configured to transparently reconstruct lost data in the event of a storage device failure. Conventional storage system architectures, however, have limitations that become problematic when solid state storage devices, that are capable of much higher data rates than hard disk drives, are implemented.

Conventional data storage system architectures have typically protected data against sector errors and failures of whole physical drives by using RAID technologies, implemented by a RAID engine (e.g., located in a RAID controller). In one or more data storage system architectures, a RAID engine has been implemented in a storage controller to organize data into stripes that span a set of storage devices. Each stripe spans 'n' storage devices and includes 'n' minus 'p' data strips and 'p' parity strips (e.g., for RAID 5, p=1; and for RAID 6, p=2). In conventional data storage system architectures, data and parity strips have typically been the same size (i.e., a size of data and parity strips has been defined by a size of a stripe and a number of storage devices used for the stripe) and each of the data and parity strips has been stored on a different storage device.

As noted above, disclosed techniques store an RWK such that security of transporting a storage system protected using local key management is improved. In various embodiments of the present disclosure, an RWK is divided into two parts. A first part of the RWK (i.e., an Encrypted RWK (ERWK)) is stored on a storage system and a second part of the RWK (i.e., an Authentication Key Encryption Key (AKEK)) is stored on an external storage device (e.g., a universal serial bus (USB) device) that is connected to the storage system via a port that corresponds to a 'known mount volume'. In general, requiring the presence of an external storage device in order to access the ERWK (to generate the RWK) provides stronger protection, as compared with other approaches.

Figure 4:
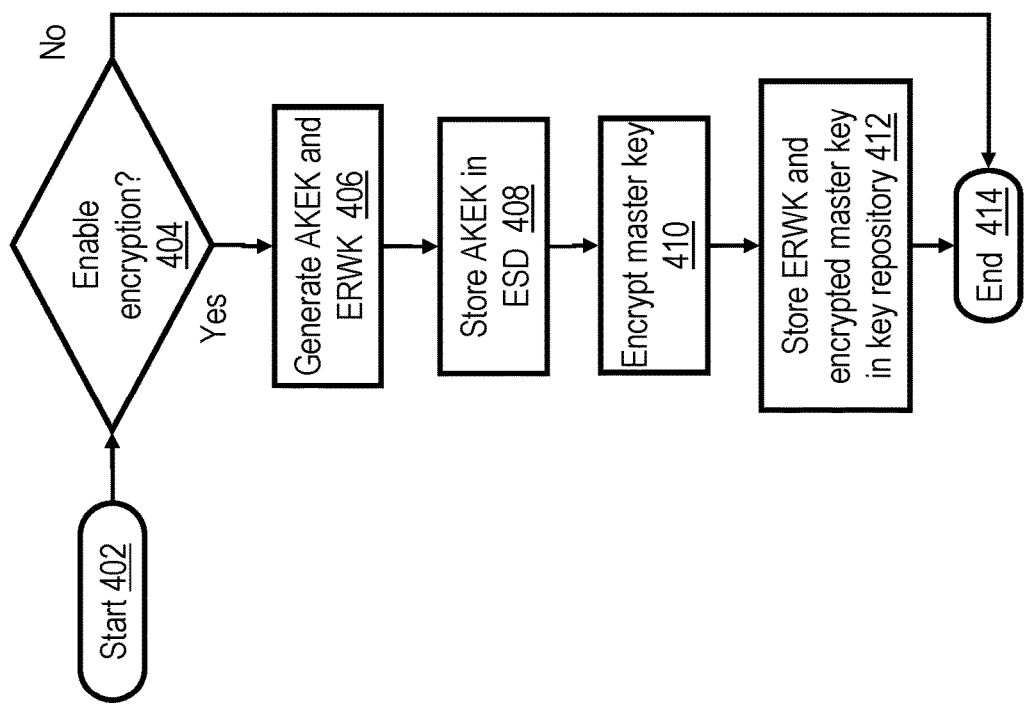
FIG. 4 is a high level logical flowchart of an exemplary process for securing user data stored in a data storage system in accordance with an embodiment of the present disclosure.

With reference to FIG. 4, an exemplary process 400 is illustrated for securing user data stored in a data storage system 120 in accordance with an embodiment of the present disclosure. It should be appreciated that process 400 may be performed by maintenance server 40 at the direction of a system administrator. Process 400 may be initiated in block 402, for example, in response to a user of maintenance server 40 initiating maintenance of a data storage system 120. Next, in decision block 404, maintenance server 40 determines whether the user has selected to enable encryption (or change encryption keys) on a data storage system 120. In response to maintenance server 40 determining that the user has not selected to enable encryption (or change encryption keys) on a data storage system 120 control transfers from block 404 to block 414, where process 400 terminates and control returns to a calling routine. In response to maintenance server 40 determining that the user has selected to enable encryption on a data storage system 120 control transfers from block 404 to block 406. In block 406 maintenance server 40 generates an AKEK and an ERWK for data storage system 120.

As previously mentioned, an RWK for each data storage system 120 can be subsequently generated by each data storage system 120 based on an HMAC function of a respective AKEK and a respective ERWK (i.e., RWK=f (AKEK, ERWK) for a data storage system 120. Next, in block 408, the AKEK is signed (using a digital certificate) and is stored on an external storage device (ESD) 60. As mentioned above, ESD 60 is electrically connected to port 50 (i.e., a 'known mount volume') of data storage system 120 to enable encryption/decryption of user data stored on data storage system 120. In one or more embodiments, ESD 60 is a USB memory stick and port 50 is a USB port. Then, in block 410, a master key is created and encrypted using the RWK. Next, in block 412, the ERWK and the encrypted master key are stored in a same key repository or different key repositories on data storage system 120. For example, the ERWK and the encrypted master key may be stored in a known location in non-volatile memory of a same NVM card 126 or a different NVM card 126. Following block 412 control transfers to block 414.

Figure 5:
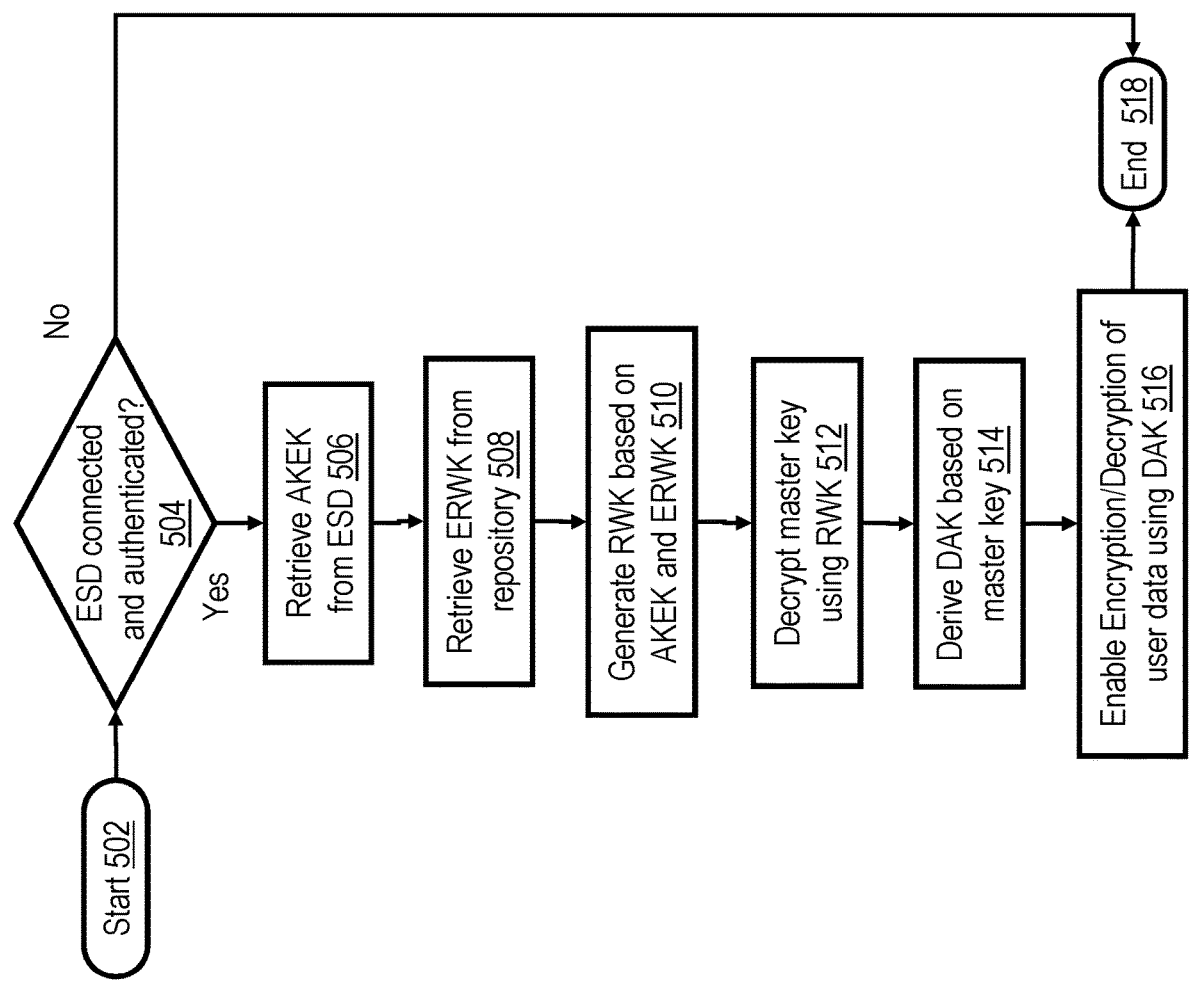
FIG. 5 is a high level logical flowchart of an exemplary process for accessing user data stored in a data storage system in accordance with an embodiment of the present disclosure.

With reference to FIG. 5, an exemplary process 500 is illustrated that may be executed by, for example, an NVM controller 140 (or more specifically SED 308 of NVM controller 140) of a data storage system 120 subsequent to a boot and/or a reboot of data storage system 120. It should be appreciated that process 500 may be simultaneously performed by multiple controllers (e.g., NVM controllers 140 of allocated NVM cards 126) of data storage system 120 depending on how drives are configured within data storage system 120. Process 500 may be initiated in block 502, for example, when NVM controller 140 is initially powered up and/or when NVM controller 140 is powered down and then powered up. Next, in decision block 504, NVM controller 140 determines whether an authenticated ESD 60 is electrically connected to port 50 of data storage system 120. In response to NVM controller 140 determining that an authenticated ESD 60 is not electrically connected to port 50 of data storage system 120 control transfers from block 504 to block 518, where process 500 terminates and control returns to a calling process.

In response to NVM controller 140 determining that an authenticated ESD 60 is electrically connected to port 50 of data storage system 120 control transfers from block 504 to block 506. In block 506 NVM controller 140 retrieves the AKEK from ESD 60. Next, in block 508, NVM controller 140 retrieves the ERWK from a key repository in data storage system 120. Then, in block 510, NVM controller 140 generates an RWK based on an HMAC function of the AKEK and the ERWK. Next, in block 512, NVM controller 140 retrieves an encrypted master key from the key repository in data storage system 120 and decrypts the encrypted master key with the RWK. Then, in block 514, NVM controller 140 derives one or more DAKs based on the unencrypted master key. For example, each DAK may be a function of the master key and a respective drive serial number (i.e., DAK=f(master key, drive serial number)). Next, in block 516, NVM controller 140 enables encryption/decryption of user data for the one or more drives using the respective DAKs. Following block 516 process 500 terminates in block 518.

Advantageously, the disclosed techniques improve security of a data storage system that employs local key management.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a NVM controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of an NVM such as a phase change memory (PCM), it should be appreciated that embodiments of the present invention can also be used with other types of non-volatile random access memory (NVRAM) including, for example, flash memory, as well as traditional rotational hard drives (HDDs), shingled magnetic recording hard disk drives (SMR HDDs) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of providing data security for a data storage system using local key management, comprising:
   in response to connecting an external storage device to a port of the data storage system, retrieving, by a controller, an authentication key encryption key (AKEK) for the data storage system from the external storage device to the data storage system;
   generating, by the controller, a random wrapper key (RWK) based on the AKEK and an encrypted random wrapper key (ERWK) for the data storage system, wherein the ERWK is retrieved from a first key repository of the data storage system;
   decrypting, by the controller, a master key for the data storage system using the RWK, wherein the master key is retrieved from a second key repository of the data storage system;
   deriving, by the controller, a device access key (DAK) based on the master key; and
   using, by the controller, the DAK to encrypt/decrypt data for a drive associated with the DAK.

2. The method of claim 1, wherein the port is associated with a known mount volume for the data storage system.

3. The method of claim 1, wherein the external storage device is a universal serial bus (USB) device.

4. The method of claim 1, wherein the RWK is generated by calculating a hash function of the ERWK and the AKEK.

5. The method of claim 1, wherein the AKEK is only retrieved subsequent to authenticating the external storage device.

6. The method of claim 1, wherein the drive is a non-volatile memory drive.

7. The method of claim 1, wherein the drive is a hard disk drive.

8. The method of claim 1, wherein the drive is a flash memory drive.

9. The method of claim 1, wherein the DAK is a function of the master key and a serial number for the drive.

10. The method of claim 1, wherein the controller is a self-encrypting device (SED) engine.

11. A data storage system, comprising:
    a non-volatile memory (NVM) array; and
    a controller coupled to the NVM array, wherein the controller is configured to:
      in response to connection of an external storage device to a port of the data storage system, retrieve an authentication key encryption key (AKEK) for the data storage system from the external storage device to the data storage system;
      generate a random wrapper key (RWK) based on the AKEK and an encrypted random wrapper key (ERWK) for the data storage system, wherein the ERWK is retrieved from a first key repository of the data storage system;
      decrypt a master key for the data storage system using the RWK, wherein the master key is retrieved from a second key repository of the data storage system;
      derive a device access key (DAK) based on the master key; and
      use the DAK to encrypt/decrypt data for a drive associated with the DAK.

12. The data storage system of claim 11, wherein the port is associated with a known mount volume for the data storage system.

13. The data storage system of claim 11, wherein the external storage device is a universal serial bus (USB) device.

14. The data storage system of claim 11, wherein the RWK is generated by calculating a hash function of the ERWK and the AKEK.

15. The data storage system of claim 11, wherein the AKEK is only retrieved subsequent to authenticating the external storage device.

16. The data storage system of claim 11, wherein the drive is one of a non-volatile memory drive, a hard disk drive, and a flash memory drive.

17. The data storage system of claim 11, wherein the DAK is a function of the master key and a serial number for the drive.

18. The data storage system of claim 11, wherein the controller is a self-encrypting device (SED) engine.

19. A computer program product, the computer program product comprising a computer readable storage medium having program instructions embodied therein, the program instructions executable by a controller, to cause the controller to:

in response to connection of an external storage device to a port of a data storage system, retrieve an authentication key encryption key (AKEK) for the data storage system from the external storage device to the data storage system;

generate a random wrapper key (RWK) based on the AKEK and an encrypted random wrapper key (ERWK) for the data storage system, wherein the ERWK is retrieved from a first key repository of the data storage system;

decrypt a master key for the data storage system using the RWK, wherein the master key is retrieved from a second key repository of the data storage system;

derive a device access key (DAK) based on the master key; and use the DAK to encrypt/decrypt data for a drive associated with the DAK.

20. The computer program product of claim 19, wherein the port is associated with a known mount volume for the data storage system, the external storage device is a universal serial bus (USB) device, the RWK is generated by calculating a hash function of the ERWK and the AKEK, and the first and second key repositories correspond to a same key repository.

\* \* \* \* \*